US012361247B2

United States Patent
Singh et al.

(10) Patent No.: US 12,361,247 B2
(45) Date of Patent: *Jul. 15, 2025

(54) DYNAMIC MACHINE READABLE CODE

(71) Applicant: Micron Technology, Inc., Boise, ID (US)

(72) Inventors: Yashvi Singh, Boise, ID (US); Diana Calhoun Majerus, Boise, ID (US); Kristina Lauren Ming, Boise, ID (US); Maria Pat F. Chavarria, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,934

(22) Filed: Apr. 26, 2024

(65) Prior Publication Data

US 2024/0296304 A1    Sep. 5, 2024

Related U.S. Application Data

(63) Continuation of application No. 18/049,435, filed on Oct. 25, 2022, now Pat. No. 12,039,385.

(51) Int. Cl.
*G06K 19/06* (2006.01)
*H04L 9/08* (2006.01)

(52) U.S. Cl.
CPC ........ *G06K 19/06037* (2013.01); *H04L 9/088* (2013.01)

(58) Field of Classification Search
CPC ................. G06K 19/06037; H04L 9/088

USPC .......................................................... 235/494
See application file for complete search history.

(56) References Cited

U.S. PATENT DOCUMENTS

| 11,748,704 B1 | 9/2023 | Groom et al. |
| 11,838,422 B1 | 12/2023 | Nam et al. |
| 2023/0198968 A1 | 6/2023 | Medvinsky et al. |
| 2023/0259643 A1 | 8/2023 | Szigeti et al. |

OTHER PUBLICATIONS

Co-pending U.S. Appl. No. 18/049,435, inventors Singh; Yashvi et al., filed Oct. 25, 2022.

*Primary Examiner* — Allyson N Trail
(74) *Attorney, Agent, or Firm* — Harrity & Harrity, LLP

(57) ABSTRACT

In some implementations, a server device may generate a machine readable code that conveys first information associated with a first entity. The server device may provide an indication of the machine readable code that indicates the first information. The server device may obtain a request to update information conveyed by the machine readable code, the request including an indication of at least one of the machine readable code or the first information. The server device may modify the first information conveyed by the machine readable code to second information, based on the request and based on authenticating the request, wherein the second information includes a first secure information layer indicating the first information and a second secure information layer indicating information indicated by the request. The server device may provide, to the communication device, an indication of at least one of the machine readable code or the second information.

20 Claims, 8 Drawing Sheets

DYNAMIC MACHINE READABLE CODE

RELATED APPLICATION

This application is a continuation of U.S. patent application Ser. No. 18/049,435, filed Oct. 25, 2022, which is incorporated herein by reference in its entirety.

TECHNICAL FIELD

The present disclosure generally relates to machine readable data and, for example, a dynamic machine readable code.

BACKGROUND

Machine readable data, or computer readable data, may be data in a format that can be processed by a computer. In other words, a machine readable medium, or computer readable medium, may be a medium capable of storing data in a format readable by a mechanical device (e.g., rather than human readable). Examples of machine readable data and/or a machine readable medium may include magnetic recording, waveforms, and/or barcodes, among other examples. A barcode may be a machine-readable optical label that can contain information (e.g., regarding an item to which the barcode is attached). For example, a quick response (QR) code may be a type of matrix barcode (or two-dimensional barcode) that may contain data and/or a locator, identifier, and/or tracker that points to a website or application.

DETAILED DESCRIPTION

Figure 1A:
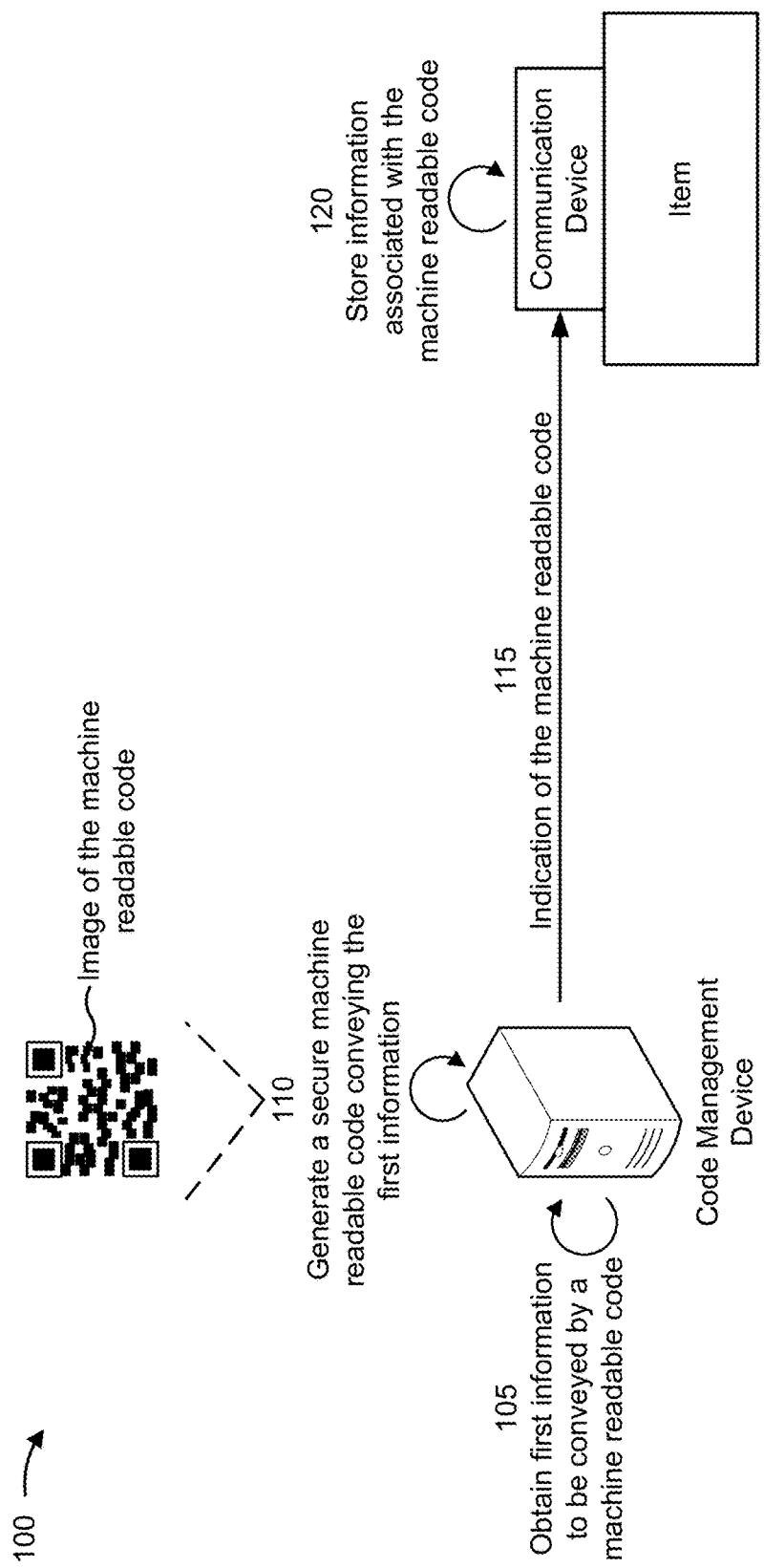
FIGS. 1A-1C are diagrams of an example associated with a dynamic machine readable code.

Machine readable codes, such as barcodes, quick response (QR) codes, matrix barcodes, and/or two-dimensional barcodes, among other examples, may be used to efficiently store and convey data. For example, a QR code may use multiple standardized encoding modes (e.g., numeric encoding, alphanumeric encoding, byte/binary encoding, and/or Kanji encoding) to store data efficiently. QR codes (e.g., matrix barcodes and/or two-dimensional barcodes) may be capable of conveying more information than other machine readable codes, such as universal product code (UPC) barcodes, because QR codes use two-dimensional coding (e.g., rather than one-dimensional coding used by other machine readable codes). A QR code may consist of black squares arranged in a square grid on a white background, including some fiducial markers, which can be read by an imaging processing device, such as a camera. The imaging processing device may process the QR code using Reed-Solomon error correction until the image can be appropriately interpreted by the imaging processing device. The imaging processing device may extract data from patterns that may be present in both horizontal and vertical components of the image of the QR code.

For example, the imaging processing device may detect three distinctive squares at corners of the image of the QR code (e.g., the distinctive squares may be fiducial markers). The imaging processing device may use a smaller square (or multiple squares) near the fourth corner of the image of the QR code to normalize the image of the QR code for size, orientation, and/or angle of viewing. The imaging processing device may convert optical components of the image of the QR code to binary numbers and may validate the converted binary numbers using an error correcting algorithm (e.g., Reed-Solomon error correction). The binary numbers may be used to provide instructions or data to the imaging processing device (or another device associated with the imaging processing device).

However, machine readable codes, such as QR codes, may be static in that after an image of the machine readable code is generated, the machine readable code may only convey the data encoded in the image. In other words, to update the data conveyed by (or encoded in) an image of a machine readable code, the image of the machine readable code may be replaced with a new image to change the data (e.g., the binary numbers) encoded within the image. This may consume processing resources, computing resources, and/or memory resources, among other examples, associated with identifying that data associated with a machine readable code is to be updated, generating a new image of the machine readable code to convey the updated data, and/or providing the new image of the machine readable code to another device, among other examples. Additionally, this reduces a flexibility associated with a use of the machine readable code. For example, in some cases, a machine readable code may be associated with (e.g., attached or affixed to) an item. Once the item leaves the possession of an entity associated with the item, the image of the machine readable code may not be updated or changed (e.g., because the image may be printed and may not be capable of being changed).

Additionally, machine readable codes may present one or more security risks. For example, a malicious actor may tamper with or alter an image of a machine readable code to redirect a device that scans or reads the altered image to a malicious uniform resource locator (URL) or website. For example, because the machine readable code may be printed and/or may be static, a malicious actor may capture an image of the machine readable code and may alter the image of the machine readable code to cause a device that scans or reads the altered image to be directed to a location that appears legitimate, but that may be used by the malicious actor to access sensitive information. This may consume processing resources, computing resources, and/or memory resources, among other examples, associated with processing the altered image of the machine readable code, identifying that the machine readable code has been altered, identifying that sensitive information has been accessed and/or changed by a malicious actor, and/or performing one or more operations to remedy fraudulent actions performed by the malicious actor after the malicious actor accesses and/or changes sensitive information, among other examples.

In some cases, a machine readable code may be dynamic in that the machine readable code may direct a device to a URL, website, or other location that may be changed. For example, a machine readable code may include a first URL that is embedded in an image of the machine readable code. The first URL may direct a device to a destination URL. In some cases, the destination URL may be changed after the machine readable code is generated (e.g., the first URL may be capable of dynamically directing a device to different destination URLs over time). However, in such examples, the information conveyed by the machine readable code may not change (e.g., the device scanning or reading the machine readable code is always directed to the first URL). In other words, current techniques to implement dynamic machine readable codes may utilize a redirection mechanism to render the machine readable code dynamic (e.g., rather than directly encoding the information to be conveyed, the machine readable code may be encoded with a redirecting URL that redirects a device to the information to be conveyed).

However, such techniques to implement dynamic machine readable codes may be susceptible to one or more security risks. For example, a malicious actor may modify or alter the image of the machine readable code to change the redirecting URL to cause a device that scans or reads the altered image to be redirected to an incorrect or malicious location or URL. Therefore, by simply changing the redirecting URL encoded in the image of the machine readable code, a malicious actor may gain access to, or change, information tracked or obtained via the machine readable code. This may consume processing resources, computing resources, and/or memory resources, among other examples, associated with performing one or more operations to remedy fraudulent actions performed by the malicious actor after the malicious actor accesses and/or changes the redirecting URL encoded in the image of the machine readable code, among other examples.

Some implementations described herein enable a secure and dynamic machine readable code. For example, a code management device (e.g., a server device or another device) may generate a machine readable code that conveys first information, the first information being included in a first secure information layer that is secured via a first one or more encryption features. The code management device may obtain a request to update information conveyed by the machine readable code, the request including an indication of at least one of the machine readable code or the first information and second information to be conveyed by the machine readable code. The code management device may authenticate the request based on the first one or more encryption features. The code management device may generate a second secure information layer that conveys the second information, the second secure information layer being secured via the first one or more encryption features or a second one or more encryption features. The code management device may generate the machine readable code that conveys the first secure information layer and the second secure information layer. The code management device may provide an indication of the machine readable code that conveys the first secure information layer and the second secure information layer.

For example, the code management device may be capable of dynamically updating or layering secure information conveyed by (or encoded in) the machine readable code over time. The code management device may store an indication of versions of the machine readable code and may use the versions to authenticate a request to update the information to be conveyed by the machine readable code. For example, the code management device may authenticate each update or change to the machine readable code (or the information conveyed by the machine readable code) using one or more encryption features described in more detail elsewhere herein. Therefore, the code management device may store a secure history of versions of the machine readable code that can be used to compare to an indication of the machine readable code received by the code management device in a request to update the information conveyed by the machine readable code.

As a result, security associated with the information conveyed by the machine readable code may be improved by securely layering updated or added information to be conveyed by the machine readable code. For example, by using one or more encryption features of an image of the machine readable code, each secure layer may be authenticated by a central source (e.g., the code management device) before the layer is added to the information to be conveyed by the machine readable code. Therefore, any unauthenticated modifications to the machine readable code and/or the information to be conveyed may be detected by the code management device (e.g., via the one or more encryption features and/or by comparing the received machine readable code to previous authenticated versions of the machine readable code). For example, the generation of the machine readable code as described herein may enable an immutable and/or tamper proof history of updates and/or changes to the information to be conveyed by the machine readable code. This may conserve processing resources, computing resources, and/or memory resources, among other examples, that would have otherwise been used to generate different images of the machine readable code every time the information is updated, to track a history of changes or updates to an information set, and/or to perform one or more operations to remedy fraudulent actions performed by the malicious actor after the malicious actor accesses and/or changes information conveyed by the machine readable code, among other examples. Further, the generation of the machine readable code as described herein may provide a mechanism to track updates and/or changes to information associated with an item and/or a service with improved security.

Figure 1B:
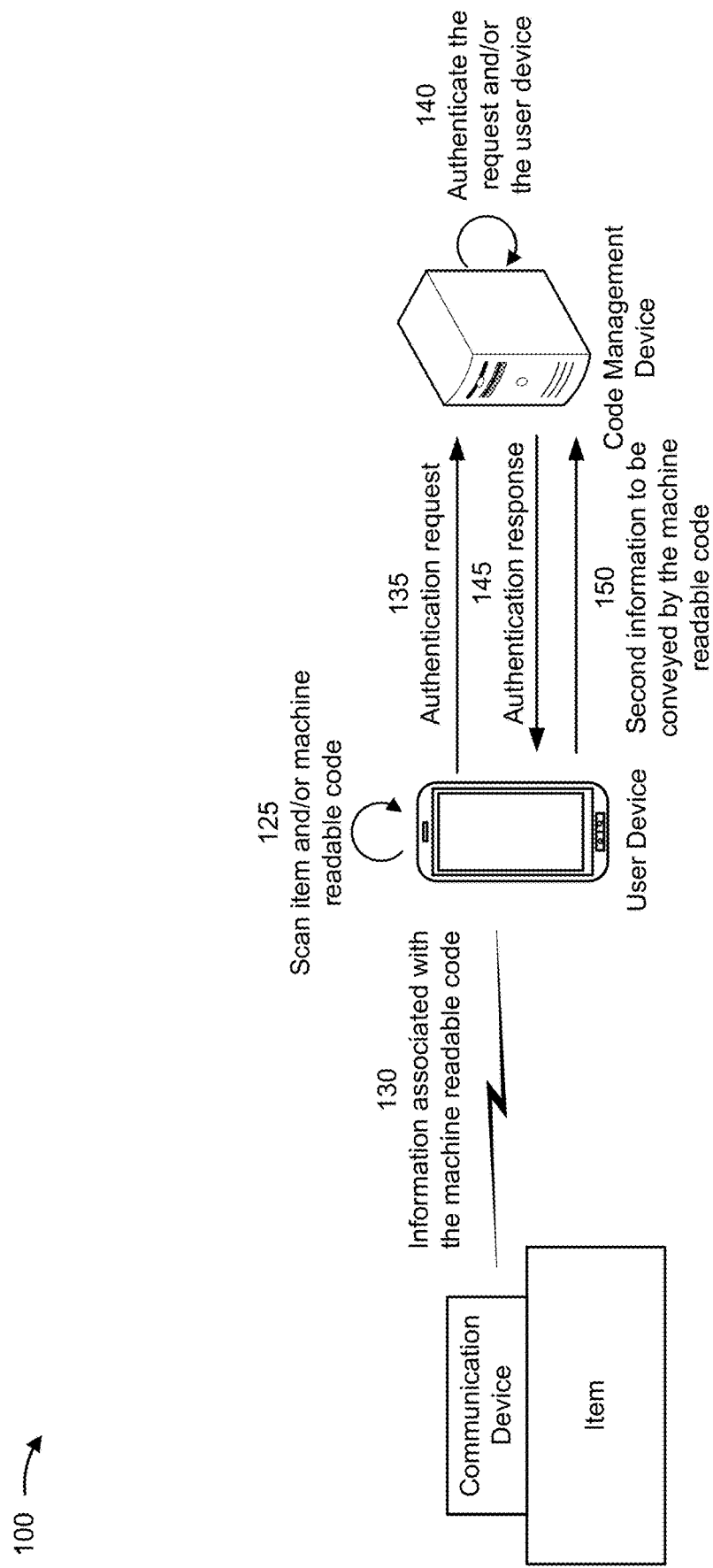
Figure 1C:
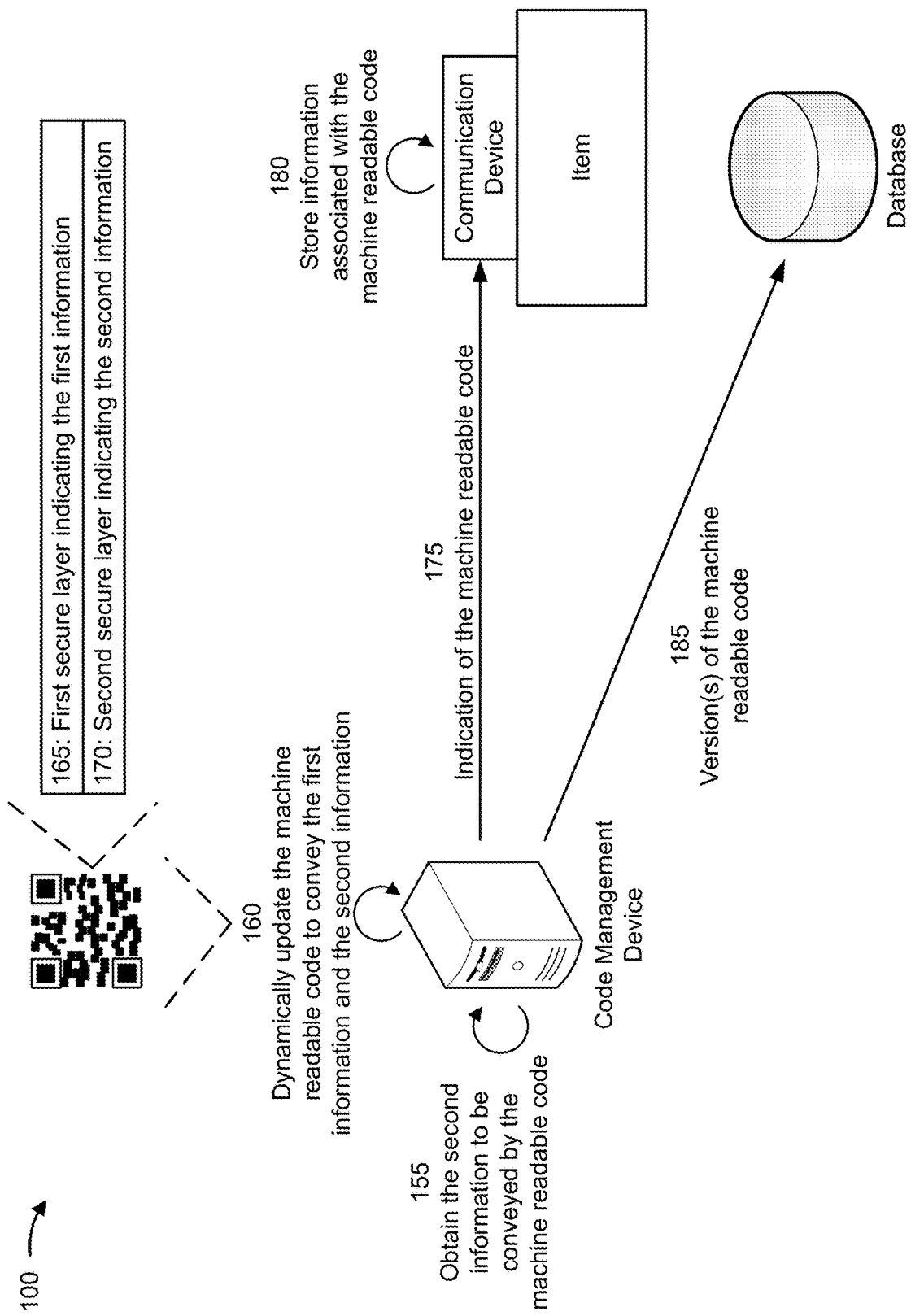

FIGS. 1A-1C are diagrams of an example 100 associated with a dynamic machine readable code. As shown in FIGS. 1A-1C, example 100 includes a code management device, a communication device (e.g., associated with an item), a user device, and a database. These devices are described in more detail below in connection with FIG. 3 and FIG. 4.

In some implementations, the machine readable code described herein may be a QR code, a barcode, a matrix barcode, a two-dimensional barcode, and/or another type of machine readable code. As shown in FIGS. 1A-1C, the machine readable code may be associated with an item. For example, the machine readable code may be used to track a use or status of the item. Additionally, or alternatively, the machine readable code may be associated a service, a product, and/or a location, among other examples, in a similar manner as described herein.

For example, the machine readable code may be used to track a status of the item within a supply chain. As another example, the machine readable code may be used to track a use or possession of the item (e.g., to track users who access and/or possess the item over time). As another example, the machine readable code may be used to track and/or permit access to a location, such as a building, a parking area, and/or a room within a building, among other examples. As described in more detail elsewhere herein, the machine readable code may be securely generated to provide an immutable history of information associated with the item, service, product, and/or location, among other examples, associated with the machine readable code.

As shown in FIG. 1A, and by reference number 105, the code management device may obtain first information to be conveyed by (e.g., to be encoded in) the machine readable code. In some implementations, the first information may be associated with an entity (e.g., an entity associated with the code management device and/or the item) and/or the item, among other examples. For example, the first information may be initial information to be conveyed by the machine readable code. In some implementations, the first information may include information associated with the item (e.g., a description of the item, a size of the item, a color of the item, and/or a weight of the item), a delivery or travel schedule associated with the item (e.g., indicating a supply chain associated with the item), information associated with the entity (e.g., a name of the entity, and/or contact information of the entity), an authentication key associated with the machine readable code (e.g., that is to be provided to enable the code management device to authenticate a device attempting to decode the machine readable code), and/or one or more encryption keys or features used to encrypt the machine readable code (e.g., included in an image of the machine readable code), among other examples.

In some implementations, the first information may include an indication of a security feature associated with an image of the machine readable code. The security feature may be a feature or component of an image of the machine readable code that causes the machine readable code to not be decodable by a machine readable code reader or scanner (e.g., a device that is configured to detect and/or decode machine readable codes, such as QR codes). In other words, the security feature may cause the machine readable code reader or scanner to not recognize the image of the machine readable code as a machine readable code. Examples of security features are depicted and described in more detail in connection with FIG. 2.

In some implementations, the code management device may obtain the first information from a memory or database associated with the code management device. Additionally, or alternatively, the code management device may receive an indication of the first information from another device (e.g., not depicted in FIG. 1A) as part of a configuration or initial generation of the machine readable code.

As shown by reference number 110, the code management device may generate a secure machine readable code that indicates or conveys the first information. For example, the code management device may generate an image of the machine readable code with the first information encoded in the image. As another example, the code management device may generate the image of the machine readable code encoded with an identifier (e.g., a unique identifier) that maps to, or is associated with, the machine readable code and/or the item in a database.

In some implementations, the code management device may generate the machine readable code by encrypting an image of the machine readable code. For example, the machine readable code may be encrypted via a private key, and/or a feature to be displayed in connection with the machine readable code (e.g., a security feature or another feature of an image of the machine readable code), among other examples. For example, the code management device may encrypt the first information (e.g., before encoding the first information in the image of the machine readable code) via the private key and/or the feature, among other examples. For example, the entity may be associated with a private key (e.g., associated with a key pair) associated with an encryption technique. In some implementations, the machine readable code may be encrypted by encoding the private key in the image of the machine readable code.

As another example, an encryption technique may include a coloring or shading used in the image of the machine readable code. For example, typical machine readable codes use a black and white coloring scheme. In some examples, the image of the machine readable code may be encrypted by including shades of grey or other colors within components or features of the image of the machine readable code. For example, the code management device may configure a scanner or reader (e.g., included in the user device) with information that indicates a meaning or data to be conveyed by the different shading or coloring within the machine readable code. As a result, devices that do not receive the configuration may be unable to obtain the meaning or data to be conveyed by the different shading or coloring within the machine readable code. As another example, an encryption technique may include a security feature that is included in the image of the machine readable code (e.g., as depicted and described in more detail in connection with FIG. 2).

As shown by reference number 115, the code management device may provide (e.g., transmit), and the communication device may obtain (e.g., receive), an indication of the machine readable code. In some implementations, the code management device may provide, and the communication device may obtain, an indication of an image of the machine readable code. For example, the code management device may provide an indication of the machine readable code that conveys the first information. In some implementations, the code management device may provide, and the communication device may obtain, instructions to cause the communication device to display the image of the machine readable code or to cause the image to be displayed (e.g., via another device, such as the user device).

In some implementations, the image of the machine readable code may be printed on, or fixed to, the item and/or the communication device. Additionally, or alternatively, the image of the machine readable code may be displayed via a screen that is associated with (e.g., fixed to or near) the item and/or the communication device. In some implementations, the image of the machine readable code may not be displayed on or by the item and/or the communication device. In such examples, the communication device may be configured to provide instructions to another device, such as the user device, to cause information (e.g., the first information) and/or the image of the machine readable code to be displayed via the user device.

As shown by reference number 120, the communication device may store information associated with the machine readable code. In some implementations, the communication device may store an indication of the image of the machine readable code. Additionally, or alternatively, the communication device may store an indication of the first information. In some implementations, the communication device may store an indication of one or more encryption techniques used to encrypt the machine readable code and/or the image of the machine readable code. In some implementations, the communication device may display the image of the machine readable code (e.g., via a screen associated with the communication device).

As shown in FIG. 1B, a user device may interact with the communication device to obtain information associated with, or conveyed by, the machine readable code. For example, as shown by reference number 125, the user device may scan (e.g., via a camera or communication component of the user device) the item and/or the machine readable code. In some implementations, a camera of the user device may capture the image of the machine readable code that is printed on the item and/or displayed by the communication device. Additionally, or alternatively, the user device may be placed in a communicative proximity of the communication device (e.g., to enable the user device and the communication device to establish a communication connection). For example, the communication device may include a component, such as a near field communication (NFC) component, a radio frequency identification (RFID) component, and/or a Bluetooth component, among other examples, that enables the communication device to communicate with other devices within a communicative proximity of the communication device.

As shown by reference number 130, the communication device may transmit, and the user device may receive, information associated with the machine readable code. In some implementations, the user device may obtain the information (e.g., the first information) based on decoding the image of the machine readable code (e.g., rather than receiving the information from the communication device). In some implementations, the user device may receive an identifier or indicator of the machine readable code. In some implementations, the user device may receive instructions that cause the user device to display the machine readable code.

For example, in some implementations, the user device may execute an application associated with reading, scanning, and/or updating information conveyed by the machine readable code. For example, the application may enable the user device to decode and/or interpret the image of the machine readable code. The application may be provided by, or managed by, the code management device (or an entity associated with the code management device). In some implementations, the communication device may provide, to the application executing on the user device, information associated with the machine readable code to enable the user device to be authenticated by the code management device, as described in more detail elsewhere herein.

In some implementations, the user device may be associated with a user and/or an entity attempting to take possession of the item. For example, the entity may be an entity associated with a supply chain of the item. As another example, the entity may be a final destination or owner of the item. As another example, the user device may be associated with a user attempting to access a location associated with the machine readable code.

In some implementations, the application may include a feature that prevents the user device from storing an indication of the machine readable code. For example, the application may provide instructions to the user device to cause the user device to not store and/or capture an image of the machine readable code. In some implementations, the feature may include disabling a screen capture feature of the machine readable code. As another example, the feature may include disabling a camera of the user device from storing an image captured by the camera. This may reduce a likelihood that a malicious actor is able to obtain the image of the machine readable code and alter the image.

As shown by reference number 135, the user device may transmit, and the code management device may receive, an authentication request. In some implementations, the authentication request may be a request to authenticate the user device and/or the machine readable code obtained by the user device. In some implementations, the authentication request may be included in a request to update information conveyed by the machine readable code. For example, the user device may receive an input (e.g., via the application executing on the user device) to change or add information to be conveyed by the machine readable code.

In other implementations, the authentication request may be a request to enable the user device to decode and/or interpret the machine readable code. For example, as described in more detail elsewhere herein, the machine readable code may include one or more encryption features and/or one or more security features that cause the user device to be unable to decode and/or interpret the image of the machine readable code without additional information or configuration.

In some implementations, the authentication request may be transmitted as part of a registration procedure. For example, prior to receiving or scanning the item and/or the machine readable code, the user device may transmit, and the code management device may receive, a registration request. For example, the user device may register, via the application executing on the user device, as an authenticated user device. For example, the code management device may determine whether the user device is associated with a user and/or an entity that is expected to come into possession of the item that is associated with the machine readable code. For example, an item may be associated with an expected order of entities within a supply chain. The user device may register as an authenticated user device based on providing information indicating that the user device is associated with an entity included in the supply chain of the item.

As another example, the machine readable code may be associated with a location (e.g., may be associated with accessing and/or tracking users who access the location). The user device may register as an authenticated user device based on providing information indicating that the user device is associated with a user who is permitted to access the location.

As shown by reference number 140, the code management device may determine whether to authenticate the authentication request and/or the user device. In some implementations, the code management device may determine whether to authenticate the authentication request and/or the user device based on the user device being associated with a user and/or an entity that is permitted to access and/or possess the item, location, and/or service associated with the machine readable code. In some implementations, the code management device may authenticate the authentication request and/or the user device based on information obtained by the user device from the communication device. For example, the user device may receive, from the communication device, an authentication key. The authentication key may be an encryption key or digital signature of the communication device. In some implementations, the authentication key may include a private key encoded in the machine readable code, a feature (e.g., an encryption feature or a security feature) included in the image of the machine readable code, and/or another encryption key.

The code management device may authenticate the request based on the authentication key matching security information associated with the machine readable code. The security information may include a corresponding key, to the encryption key, in a key pair associated with the machine readable code. As another example, the security information may include an indication of one or more encryption techniques used to encrypt the machine readable code and/or the image of the machine readable code. For example, the authentication key may match security information associated with the machine readable code if an encryption key is the same as an encryption key stored by the code management device. As another example, the authentication key may match security information associated with the machine readable code if an encryption key indicated by the request can be used to decrypt information that is encrypted using a private key associated with the machine readable code. As another example, the authentication key may match security information associated with the machine readable code if the encryption key indicates one or more (or all) encryption techniques used to encrypt the machine readable code and/or the image of the machine readable code.

As shown by reference number 145, the code management device may transmit, and the user device may receive, an authentication response (e.g., in response to the authentication request). The authentication response may indicate whether the user device is approved or authenticated to decode, access, and/or modify information to be conveyed by the machine readable code. For example, if the code management device determines that the user device is authenticated, then the code management device may transmit, and the user device may receive, an indication that the user device is approved or authenticated to decode, access, and/or modify information to be conveyed by the machine readable code. Alternatively, if the code management device determines that the user device is not authenticated, then the code management device may transmit, and the user device may receive, an indication that the user device is not approved or authenticated to decode, access, and/or modify information to be conveyed by the machine readable code.

In some implementations, if the authentication response indicates that the user device is approved and/or authenticated, then the authentication response may include configuration information to enable the user device to decode and/or interpret the image of the machine readable code. For example, the code management device may transmit, and the user device may receive, a communication that enables the user device to perform an action associated with the machine readable code. For example, the action may include processing or decoding the machine readable code, decoding a security feature associated with an image of the machine readable code, and/or submitting a request to update information conveyed by the machine readable code, among other examples. For example, the code management device may transmit, and the user device may receive, a decoding configuration that enables the user device to recognize, identify, and/or decode encryption features and/or security features that are included in an image of the machine readable code.

As another example, the code management device may transmit, and the user device may receive, an indication of a private key that was used to encrypt the information conveyed by the machine readable code and/or that was encoded into the image of the machine readable code. In some implementations, the information that enables the user device to decode the machine readable code (e.g., with one or more secure features and/or encryption features) may include an indication of the secure feature, a decoding algorithm associated with the secure feature, and/or access to an application associated with decoding the machine readable code with the secure feature, among other examples.

As a result, the user device may be enabled to obtain the first information that is encoded in the machine readable code. For example, the user device may scan and/or capture an image of the machine readable code. In some implementations, the user device may not save or store the image of the machine readable code (e.g., for enhanced security of the machine readable code). For example, the user device may scan and interpret (e.g., and not save or store) the image of the machine readable code. Based on receiving the information from the code management device, the user device may be enabled to recognize and/or interpret encryption features and/or security features that are included in an image of the machine readable code. In some implementations, the user device may decrypt an encryption feature encoded in the image of the machine readable code (e.g., using a private key obtained from the code management device). Additionally, or alternatively, the user device may obtain information based on decoding the machine readable code. The user device may decrypt the obtained information (e.g., to obtain the first information) using the private key obtained from the code management device.

In other words, the first information encoded in the machine readable code may be secured via multiple layers of security. For example, the user device may not be capable of recognizing and/or decoding the machine readable code without being authenticated by the code management device. Additionally, the user device may not obtain the first information without successfully decoding and/or decrypting encryption features and/or security features that are included in an image of the machine readable code. This may improve the security of the machine readable code and/or the information conveyed by the machine readable code.

The user device may obtain second information to be added to, or updated in, the information conveyed by the machine readable code. For example, the user device may be associated with an entity that receives the item in a supply chain associated with the item. The entity may wish to add information associated with the entity and/or a status of the item as received by the entity into the information conveyed by the machine readable code (e.g., to create a secure tracking of the item along the supply chain). As another example, the user device may be associated with a user seeking to enter or access a location. The second information may include information associated with the user to facilitate a secure tracking of users who enter and/or access the location. As another example, the user device may be associated with a user seeking to use a product or service associated with the machine readable code. The second information may include information associated with the user.

The user device may obtain the second information via the application executing on the user device. For example, the application may be configured to display the information conveyed by the machine readable code (e.g., the first information) to enable a user to access and/or view the information. The application may provide, for display via the user device, one or more pages or user interfaces to enable the user to input additional or new information to be conveyed by the machine readable code. The user device and/or the application may obtain the second information via the one or more pages or user interfaces.

In some implementations, the second information may include information associated with a second entity that is associated with a request to update the information conveyed by the machine readable code (e.g., an entity associated with the user device), a location at which the item is received by the second entity, a time at which the item is received by the second entity, a time at which the item is no longer possessed by the second entity (e.g., a time at which the item departs a possession of the second entity), information associated with the item as obtained by the second entity (e.g., a description, a size, a weight, a quantity, and/or a status), and/or an encryption key (e.g., a private key or a digital signature) associated with the second entity, among other examples. For example, the entity associated with the user device may be enabled to input information associated with the entity and/or with the item to cause the information to be conveyed by the machine readable code (e.g., in addition to the first information).

In some implementations, the second information may include an indication of one or more transactions associated with the item. For example, the item may be sold and/or transferred from one entity to another. The communication device may utilize a secure technology, such as an immutable ledger and/or a blockchain, among other examples, to track the one or more transactions associated with the item. The communication device may provide, to the user device, an indication of the immutable ledger and/or a blockchain associated with the transaction(s). The second information (e.g., provided to the code management device as described below) may include an indication of the immutable ledger and/or a blockchain associated with the transaction(s). Additionally, or alternatively, the communication device may store an indication of the immutable ledger and/or a blockchain associated with the transaction(s).

As shown by reference number 150, the user device may transmit, and the code management device may receive, an indication of the second information. For example, the code management device may obtain a request to update the machine readable code and/or the information conveyed by the machine readable code. In some implementations, the request may include an indication of the machine code and/or the first information that is encoded in the image of the machine readable code. Additionally, the request may include an indication of the second information to be conveyed by the machine readable code.

As shown in FIG. 1C, and by reference number 155, the code management device may obtain the second information to be conveyed by the machine readable code (e.g., via the request). The code management device may authenticate the request before updating and/or modifying the information to be conveyed by the machine readable code. For example, the code management device may authenticate the request based on a private key or a feature (e.g., used to encode or secure the image of the machine readable code, as described elsewhere herein) being indicated in the request to update the machine readable code.

For example, the code management device may compare information indicated by the request to information stored by the code management device to determine if the machine readable code has been altered and/or modified (e.g., without approval from the code management device). In some implementations, the code management device may compare an image of the machine readable code indicated in the request to an image of the machine readable code generated by the code management device. If the image indicated in the request matches the image generated by the code management device, then the code management device may determine that the request is authentic. In other words, the code management device may authenticate one or more requests, including the request, to update information indicated by the machine readable code based on the request indicating a current version of the machine readable code as indicated by the versions of the machine readable code stored by the code management device (e.g., in the database).

In some implementations, the code management device may authenticate the request based on the second entity being a next entity as indicated by an order of entities associated with the item. For example, the item may be associated with an order of entities (e.g., an expected order of entities within a supply chain) to be associated with the item. The code management device may determine a next entity as indicated by the order (e.g., a next entity that is expected to receive the item). If the request is associated with a different entity (e.g., than the next entity), then the code management device may not authenticate the request (e.g., the code management device may determine that the item is not following an expected supply chain path). If the request is associated with the next entity, then the code management device may authenticate the request.

Additionally, or alternatively, the code management device may authenticate the request to update information indicated by the machine readable code based on the request indicating information (e.g., the first information) encoded in the image of the machine readable code. For example, because only authenticated user devices may be capable of decoding and/or decrypting the image of the machine readable code, if the user device successfully obtains the first information, then the code management device may determine that the request is from an authenticated user device (e.g., and therefore the request is authentic). As another example, the code management device may authenticate the request based on an identifier of the user device. For example, the code management device may store indications of identifiers of one or more user devices, including the user device, that are authenticated by the code management device (e.g., as described elsewhere herein). If the identifier of the user device associated with the request is included in the identifiers of one or more user devices that are authenticated by the code management device, then the code management device may determine that the request is authentic. If the code management device determines that the request is authentic, then the code management device may proceed with updating the information to be conveyed by the machine readable code (e.g., as described below). If the code management device determines that the request is not authentic, then the code management device may refrain from updating the information to be conveyed by the machine readable code.

As shown by reference number 160, the code management device may dynamically update the machine readable code to cause the machine readable code to convey the first information and the second information. For example, the code management device may obtain second information for the machine readable code based on the request. In some implementations, the second information may include the first information and information indicated by the request. Generating the second information causes the machine readable code to indicate the second information (e.g., when scanned or read by a user device).

For example, the code management device may modify the first information conveyed by the machine readable code to second information based on the request and based on authenticating the request. In some implementations, the second information may include a first secure information layer indicating the first information and a second secure information layer indicating information indicated by the request. In other words, each layer of information conveyed by the machine readable code may be separately authenticated, secured, and/or encrypted by the code management device. As a result, the addition of information conveyed by the machine readable code may increase a security of the machine readable code (e.g., by adding additional layers of security).

For example, as described above, and as shown by reference number 165, the machine readable code may include a first secure layer indicating the first information. The first secure layer may be encrypted using a private key, a feature of the image of the machine readable code, and/or a security feature, among other examples (e.g., as described in more detail elsewhere herein). As shown by reference number 170, the code management device may update the information to be conveyed by the machine readable code (e.g., based on receiving and authenticating the request from the user device) to include a second secure layer indicating the second information (e.g., the information indicated by the request). For example, the code management device may encrypt the second information via the private key, the feature, another private key (e.g., an encryption key and/or a digital signature associated with the user device and/or the entity associated with the user device), or another feature to be displayed in connection with the machine readable code (e.g., an encryption feature and/or a security feature), among other examples. In other words, the code management device may use different encryption techniques to secure each layer of information to be conveyed by the machine readable code.

In some implementations, the encryption techniques used by the code management device to secure a given layer of information may be based on an entity associated with the given layer. For example, for a first entity (e.g., an owner or manufacturer of the item), the code management device may use a first one or more encryption techniques to secure a layer of information provided by the first entity. For a second entity (e.g., a user or distributor of the item), the code management device may use a second one or more encryption techniques to secure a layer of information provided by the second entity. Additionally, or alternatively, the encryption techniques used by the code management device to secure layers of information may be changed dynamically over time (e.g., randomly, periodically, and/or based on configuration input obtained by the code management device).

For example, the code management device may generate a second secure information layer that conveys the second information, the second secure information layer being secured via the first one or more encryption features (e.g., used to secure the first secure information layer) and/or a second one or more encryption features. As described elsewhere herein, an encryption feature may include a private key encoded in an image of the machine readable code, a feature associated with an orientation or a color of the image of the machine readable code, and/or a feature associated with the image of the machine readable code that causes the image to not be recognized by one or more machine readable code scanning techniques, among other examples.

The code management device may generate the machine readable code that conveys the first secure information layer and the second secure information layer. In some implementations, the machine readable code may be a virtual machine readable code (e.g., a virtual QR code). As used herein, a virtual machine readable code may be a machine readable code that is associated with a single image but that is capable of conveying different information over time (e.g., different information obtained from the code management device). For example, the image of the machine readable code may remain the same over time. However, when the machine readable code is scanned or decoded by a user device, the information conveyed to the user device may be different depending on information, including the first information and/or the second information, stored by the code management device. For example, different secure layers may be added to the information conveyed to the user device over time.

In some implementations, the different secure layers may be provided to the communication device such that when a user device successfully decodes the machine readable code, the communication device may provide the different secure layers to the user device. As another example, the machine readable code may convey an identifier (e.g., a unique identifier) that is conveyed via the image of the machine readable code and that is secured via the one or more encryption techniques described elsewhere herein. A user device may provide the identifier to the code management device based on decoding the machine readable code. The code management device may provide the one or more secure layers of information to the user device based on receiving the indication of the identifier associated with the machine readable code.

In some implementations, the code management device may update or modify the image of the machine readable code when a new secure layer of information is to be conveyed by the machine readable code. For example, the machine readable code that conveys the first information may be associated with a first machine readable code image that conveys the first secure information layer indicating the first information. The machine readable code that conveys the second information may be associated with a second machine readable code image that conveys the first secure information layer indicating the first information and the second secure information layer indicating information indicated by the request. The first machine readable code image and the second machine readable code image may both be associated with the item, service, product, and/or location, among other examples (e.g., that is associated with the machine readable code).

As shown by reference number 175, the code management device may transmit, and the communication device may receive, an indication of the updated machine readable code. In some implementations, the code management device may provide, and the communication device may obtain, an indication of updated information to be conveyed when the machine readable code is scanned or decoded (e.g., by a user device). For example, the code management device may provide an indication of the first secure information layer and the second secure information layer. In some implementations, the code management device may provide, and the communication device may obtain, an indication of an updated image of the machine readable code (e.g., to be displayed by the communication device and/or provided to the user device for display by the user device).

As shown by reference number 180, the communication device may store updated information associated with the machine readable code. For example, the communication device may store an indication of an updated image of the machine readable code. Additionally, or alternatively, the communication device may store an indication of the first secure information layer and the second secure information layer. Storing the information may enable the communication device to provide updated secure information to be conveyed with and/or by the machine readable code. For example, if a user device successfully decodes the machine readable code, then the communication device may provide, to the user device, the first secure information layer and the second secure information layer (e.g., rather than just the first secure information layer, as would have otherwise occurred without the update obtained from the code management device).

As shown by reference number 185, the communication device may store (e.g., in the database) an indication of an updated version of the machine readable code. For example, after dynamically updating the machine readable code to convey the first secure information layer and the second secure information layer, the code management device may store an indication of an updated version of the machine readable code. In some implementations, the updated version may include an indication of secure layer(s) of information to be conveyed by the machine readable code. Additionally, or alternatively, the updated version may include an indication of a current version of an image of the machine readable code. Storing different versions of the machine readable code may enable the code management device to securely track changes to the information conveyed by the machine readable code.

For example, if a malicious actor successfully alters the information to be conveyed by the machine readable code without permission from the code management device, the code management device may be enabled to identify when the alteration occurred (e.g., by comparing different versions of the machine readable code as stored by the code management device). Additionally, the code management device may be enabled to restore an authenticated version of the machine readable code (e.g., from the stored versions of the machine readable code). In some implementations, the code management device may authenticate one or more requests to update information indicated by the machine readable code based on the request indicating a current version of the machine readable code as indicated by the versions of the machine readable code stored in the database. For example, if the machine readable code is altered without permission from the code management device, then the code management device may be enabled to identify the alteration and deny a request to modify the machine readable code (and/or to restore the current authenticated version of the machine readable code).

The machine readable code and/or the information to be conveyed by the machine readable code may continue to be updated in a similar manner as described herein. For example, the code management device may obtain (e.g., from another user device associated with a third entity) another request to update information conveyed by the machine readable code. The request may include an indication of the machine readable code and/or the second information (e.g., the first secure information layer and the second secure information layer). The code management device may modify the second information conveyed by the machine readable code to third information based on the other request and based on authenticating the other request in a similar manner as described in more detail elsewhere herein. For example, the third information may include the first secure information layer indicating the first information, the second secure information layer indicating information indicated by the request, and a third secure information layer indicating information indicated by the other request.

In this way, the code management device may generate a secure and immutable history of the information added to and/or conveyed by the machine readable code. As a result, security associated with the information conveyed by the machine readable code may be improved by securely layering updated or added information to be conveyed by the machine readable code. For example, by using one or more encryption features of an image of the machine readable code, each secure layer may be authenticated by a central source (e.g., the code management device) before the layer is added to the information to be conveyed by the machine readable code. Therefore, any unauthenticated modifications to the machine readable code and/or the information to be conveyed may be detected by the code management device (e.g., via the one or more encryption features and/or by comparing the received machine readable code to previous authenticated versions of the machine readable code). For example, the generation of the machine readable code as described herein may enable an immutable and/or tamper proof history of updates and/or changes to the information to be conveyed by the machine readable code. This may conserve processing resources, computing resources, and/or memory resources, among other examples, that would have otherwise been used to generate different images of the machine readable code every time the information is updated, to track a history of changes or updates to an information set, and/or to perform one or more operations to remedy fraudulent actions performed by a malicious actor after the malicious actor accesses and/or changes information conveyed by the machine readable code, among other examples. Further, the generation of the machine readable code as described herein may provide a mechanism to track updates and/or changes to information associated with an item and/or a service with improved security.

As indicated above, FIGS. 1A-1C are provided as an example. Other examples may differ from what is described with regard to FIGS. 1A-1C.

Figure 2:
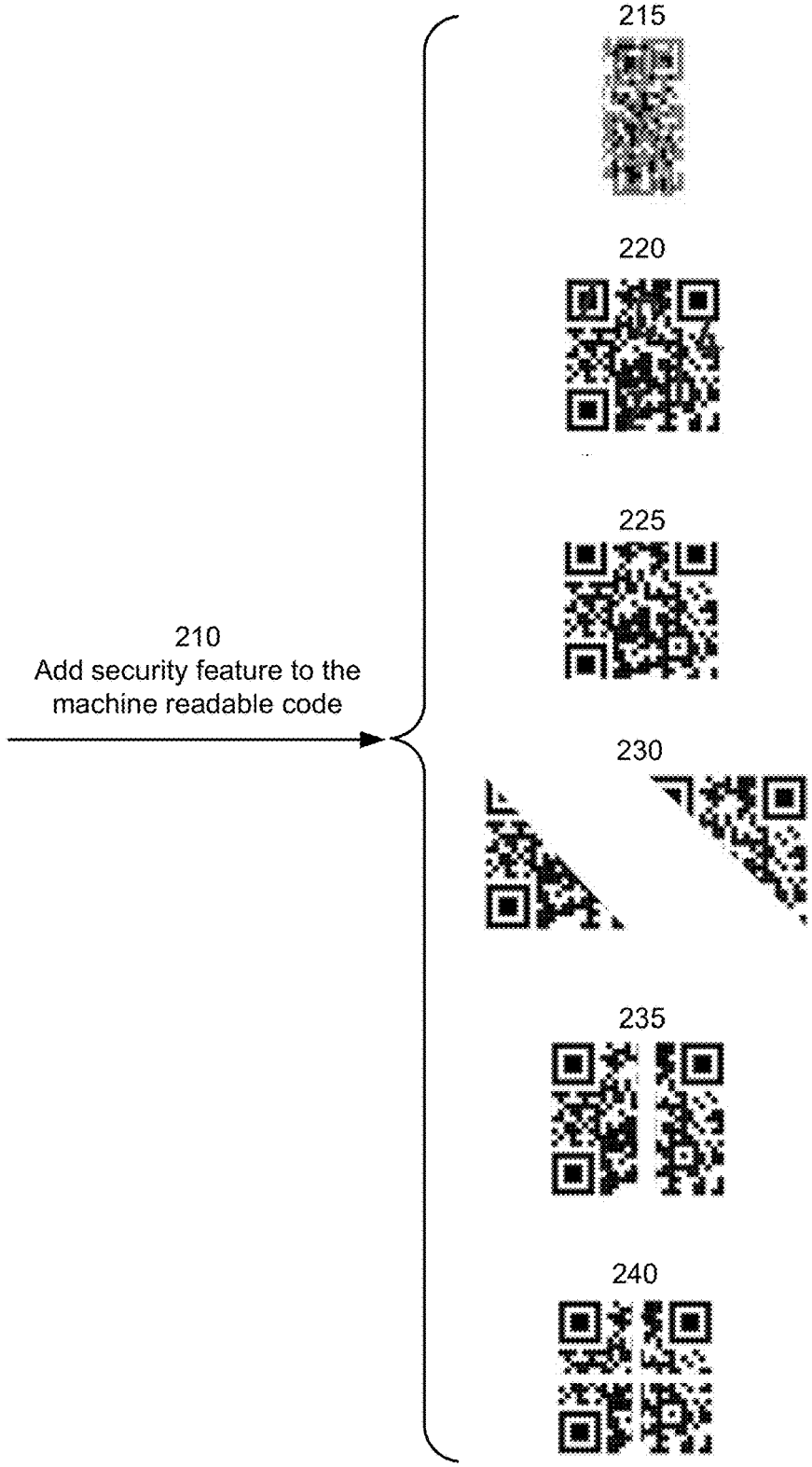
FIG. 2 is a diagram illustrating an example associated with security features of an image of a machine readable code.

FIG. 2 is a diagram illustrating an example 200 associated with security features of an image of a machine readable code. As shown in FIG. 2, and by reference number 205, an image of the machine readable code may be generated (e.g., by the code management device in a similar manner as described elsewhere herein). The image of the machine readable code may convey information.

As shown by reference number 210, a security feature may be added to the image of the machine readable code. For example, the security feature may be a feature included in the image of the machine readable code that causes the image to not be recognized by one or more machine readable code scanning techniques as a machine readable code. In other words, without additional configuration or information, a traditional machine readable code scanning technique may not recognize the image of the machine readable code (that includes a security feature) as a machine readable code. As a result, a security of the machine readable code may be increased because the security feature adds an additional layer of security for the information conveyed by the image of the machine readable code. In other words, the additional configuration or information may be needed for a device (e.g., a user device) to recognize and/or decode the image of the machine readable code.

As shown by reference number 215, a first example security feature may include merging a first portion of the image of the machine readable code with a second portion of the image of the machine readable code. For example, the image of the machine readable code may be "folded" such that the first portion (or first half) of the image is overlayed on the second portion (or second half) of the image. As shown by reference number 220, a second example security feature may include encoding a secure key (e.g., an encryption key) in the image of the machine readable code. For example, a device (e.g., a user device) may be unable to obtain information conveyed by the image of the machine readable code without decrypting the secure key (e.g., which may require the device to obtain a private key associated with the secure key).

As shown by reference number 225, a third example security feature may include removing a portion of the image of the machine readable code. For example, a portion of one or more fiducial markers included in the image of the machine readable code may be removed. For example, a fiducial marker may include a square at a corner of the image of the machine readable code. The third example security feature may include removing (or cropping) a portion of one or more of the squares such that a device is not capable of normalizing the image of the machine readable code for size, orientation, and/or angle of viewing.

As shown by reference number 230, a fourth example security feature may include splitting the image of the machine readable code into a first portion and a second portion and separating the first portion and the second portion by a distance. For example, as shown in FIG. 2, the image of the machine readable code may be split diagonally into the first portion and the second portion. The first portion and the second portion may be separated by a distance such that a device is not capable of recognizing the portions of the machine readable code as a single image. As shown by reference number 235, a fifth example security feature may include splitting the image of the machine readable code along a vertical line and separating the first portion and the second portion along the vertical line by a distance (e.g., in a similar manner as described above in connection with the fourth example security feature). As shown by reference number 240, a sixth example security feature may include inserting one or more components into the image of the machine readable code. For example, as shown in FIG. 2, the one or more components may include one or more lines having a solid color (such as white). In some implementations, a thickness or size of the one or more components may satisfy a threshold. For example, the thickness or size of the one or more components may be large enough to cause a device attempting to decode the image to not recognize the image of the machine readable code as a machine readable code.

As indicated above, FIG. 2 is provided as an example. Other examples may differ from what is described with regard to FIG. 2.

Figure 3:
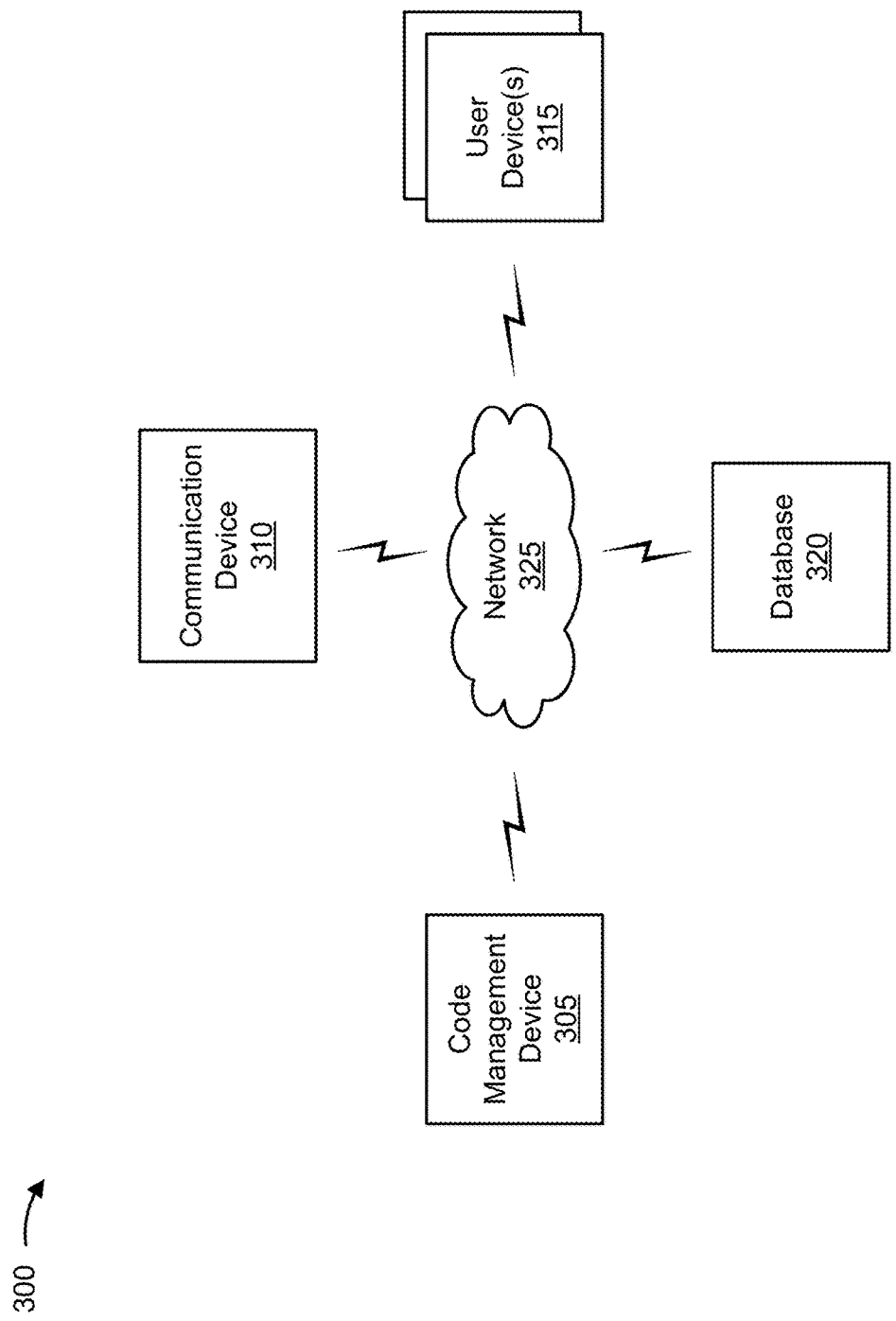
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a code management device 305, a communication device 310, one or more user devices 315, a database 320, and a network 325. Devices of environment 300 may interconnect via wired connections, wireless connections, or a combination of wired and wireless connections.

The code management device 305 may include one or more devices capable of receiving, generating, storing, processing, providing, and/or routing information associated with generating a dynamic machine readable code, as described elsewhere herein. The code management device 305 may include a communication device and/or a computing device. For example, the code management device 305 may include a server, such as an application server, a client server, a web server, a database server, a host server, a proxy server, a virtual server (e.g., executing on computing hardware), or a server in a cloud computing system. In some implementations, the code management device 305 may include computing hardware used in a cloud computing environment.

The communication device 310 may include one or more devices capable of receiving, generating, storing, processing, and/or providing information associated with a dynamic machine readable code, as described elsewhere herein. The communication device 310 may include a communication device and/or a computing device. For example, the communication device 310 may include a wireless communication device, a mobile phone, a user equipment, a tablet computer, an NFC component, an RFID component, a Bluetooth component, or a similar type of device.

The user device 315 may include one or more devices capable of receiving, generating, storing, processing, and/or providing information associated with a dynamic machine readable code, as described elsewhere herein. The user device 315 may include a communication device and/or a computing device. For example, the user device 315 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The database 320 may include one or more devices capable of receiving, generating, storing, processing, and/or providing information associated with a dynamic machine readable code, as described elsewhere herein. The database 320 may include a communication device and/or a computing device. For example, the database 320 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the database 320 may store versions of the machine readable code and/or versions of information to be conveyed by the machine readable code, as described elsewhere herein.

The network 325 may include one or more wired and/or wireless networks. For example, the network 325 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 325 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
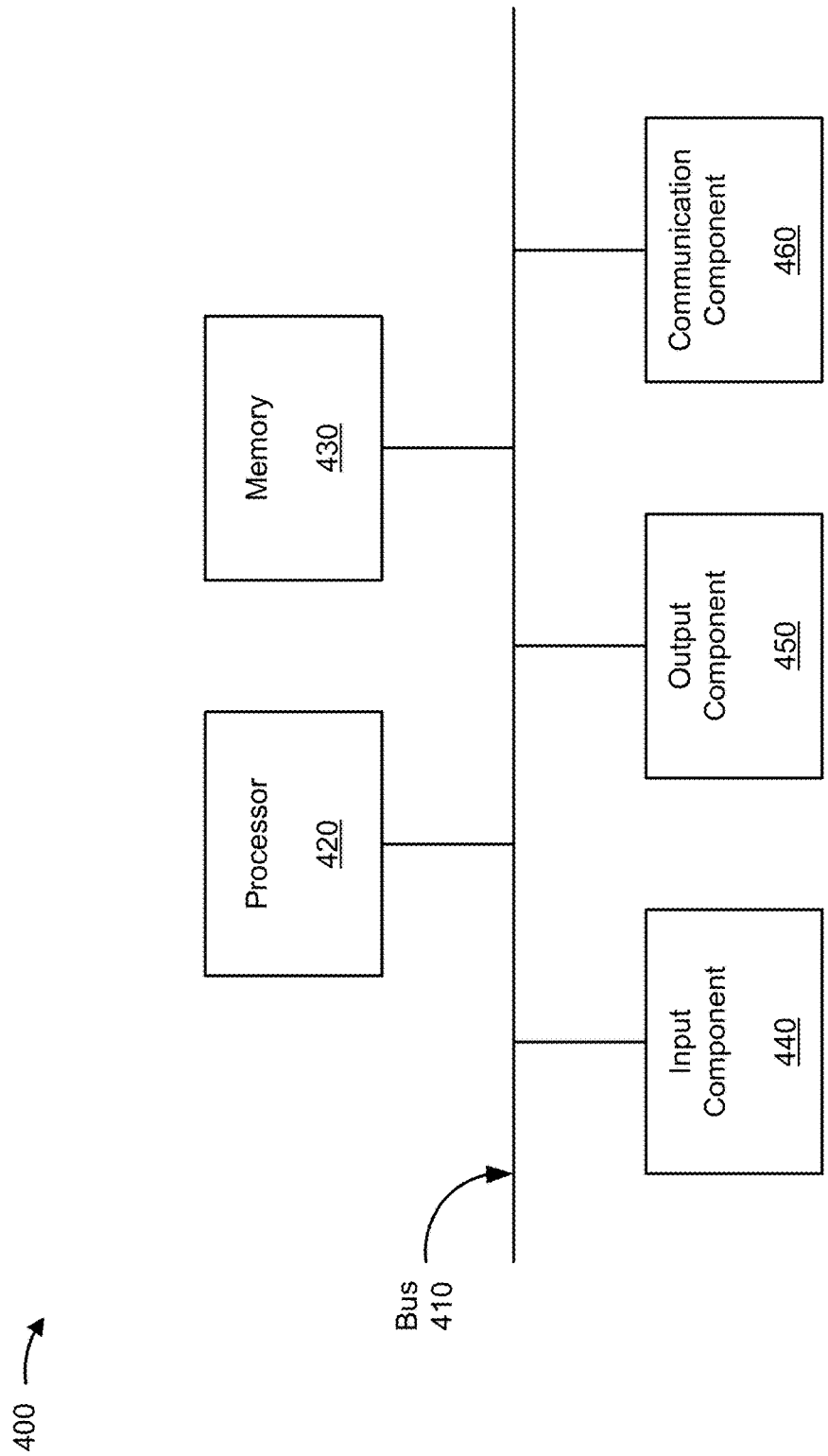
FIG. 4 is a diagram of example components of a device associated with a dynamic machine readable code.

FIG. 4 is a diagram of example components of a device 400 associated with a dynamic machine readable code. The device 400 may correspond to the code management device 305, the communication device 310, the user device 315, and/or the database 320, among other examples. In some implementations, the code management device 305, the communication device 310, the user device 315, and/or the database 320, among other examples, may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include a cloud-based memory. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
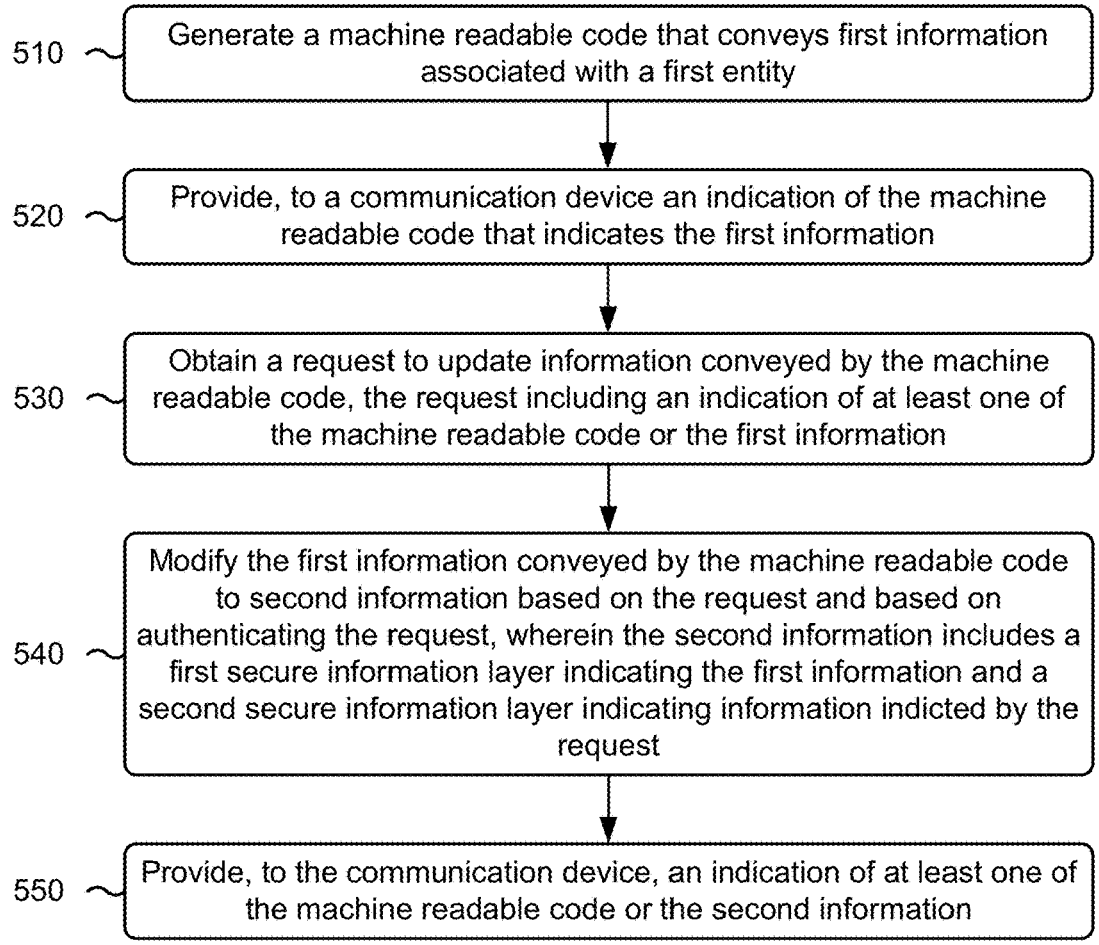
FIG. 5 is a flowchart of an example method associated with a dynamic machine readable code.

FIG. 5 is a flowchart of an example method 500 associated with a dynamic machine readable code. In some implementations, a code management device (e.g., the code management device 305) may perform or may be configured to perform the method 500. In some implementations, another device or a group of devices separate from or including the code management device (e.g., the communication device 310, a user device 315, and/or the database 320) may perform or may be configured to perform the method 500. Additionally, or alternatively, one or more components of the code management device (e.g., the processor 420, the memory 430, the input component 440, the output component 450, and/or the communication component 460) may perform or may be configured to perform the method 500. Thus, means for performing the method 500 may include the code management device and/or one or more components of the code management device. Additionally, or alternatively, a non-transitory computer-readable medium may store one or more instructions that, when executed by the code management device, cause the code management device to perform the method 500.

As shown in FIG. 5, the method 500 may include generating a machine readable code that conveys first information associated with a first entity (block 510). As further shown in FIG. 5, the method 500 may include providing an indication of the machine readable code that indicates the first information (block 520). As further shown in FIG. 5, the method 500 may include obtaining a request to update information conveyed by the machine readable code, the request including an indication of at least one of the machine readable code or the first information (block 530). As further shown in FIG. 5, the method 500 may include modifying the first information conveyed by the machine readable code to second information, based on the request and based on authenticating the request, wherein the second information includes a first secure information layer indicating the first information and a second secure information layer indicating information indicated by the request (block 540). As further shown in FIG. 5, the method 500 may include providing, to the communication device, an indication of at least one of the machine readable code or the second information (block 550).

The method 500 may include additional aspects, such as any single aspect or any combination of aspects described below and/or described in connection with one or more other methods or operations described elsewhere herein.

In a first aspect, the method 500 includes obtaining another request to update information conveyed by the machine readable code, the request including an indication of at least one of the machine readable code or the second information, and modifying the second information conveyed by the machine readable code to third information based on the other request and based on authenticating the other request, wherein the third information includes the first secure information layer indicating the first information, the second secure information layer indicating information indicated by the request, and a third secure information layer indicating information indicated by the other request.

In a second aspect, alone or in combination with the first aspect, the method 500 includes authenticating the request based on at least one of an encryption key encoded in the first information, a secure feature included in an image of the machine readable code, an authentication key provided by a user device associated with the request, or an order of entities associated with the machine readable code.

In a third aspect, alone or in combination with one or more of the first and second aspects, generating the machine readable code comprises generating a secure feature to be included in an image of the machine readable code, wherein the secure feature causes the machine readable code to not be decodable by a machine readable code reader.

In a fourth aspect, alone or in combination with one or more of the first through third aspects, the method 500 includes authenticating the request, and providing, to a device associated with the request, information that enables the device to decode the machine readable code with the secure feature.

In a fifth aspect, alone or in combination with one or more of the first through fourth aspects, the information that enables the device to decode the machine readable code with the secure feature includes at least one of an indication of the secure feature, a decoding algorithm associated with the secure feature, or accessing to an application associated with decoding the machine readable code with the secure feature.

In a sixth aspect, alone or in combination with one or more of the first through fifth aspects, the machine readable code that conveys the first information is associated with a first machine readable code image that conveys the first secure information layer indicating the first information, and the machine readable code that conveys the second information is associated with a second machine readable code image that conveys the first secure information layer indicating the first information and the second secure information layer indicating information indicated by the request.

In a seventh aspect, alone or in combination with one or more of the first through sixth aspects, the first machine readable code image and the second machine readable code image are both associated with an item or a service.

In an eighth aspect, alone or in combination with one or more of the first through seventh aspects, providing the indication of the machine readable code that indicates the first information causes a first machine readable code image that conveys the first secure information layer to be displayed, and providing the indication of at least one of the machine readable code or the second information causes a machine readable code image that conveys the first secure information layer and the second secure information layer to be displayed, wherein the machine readable code image is the first machine readable code image or a second machine readable code image.

In a ninth aspect, alone or in combination with one or more of the first through eighth aspects, the machine readable code is associated with an item, the method 500 further comprising storing an indication of versions of the machine readable code including a first version that indicates the first secure information layer and a second version that indicates the first secure information layer and the second secure information layer, wherein the indication of the versions of the machine readable code facilitates a tracking of the item over a distribution chain.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

Figure 6:
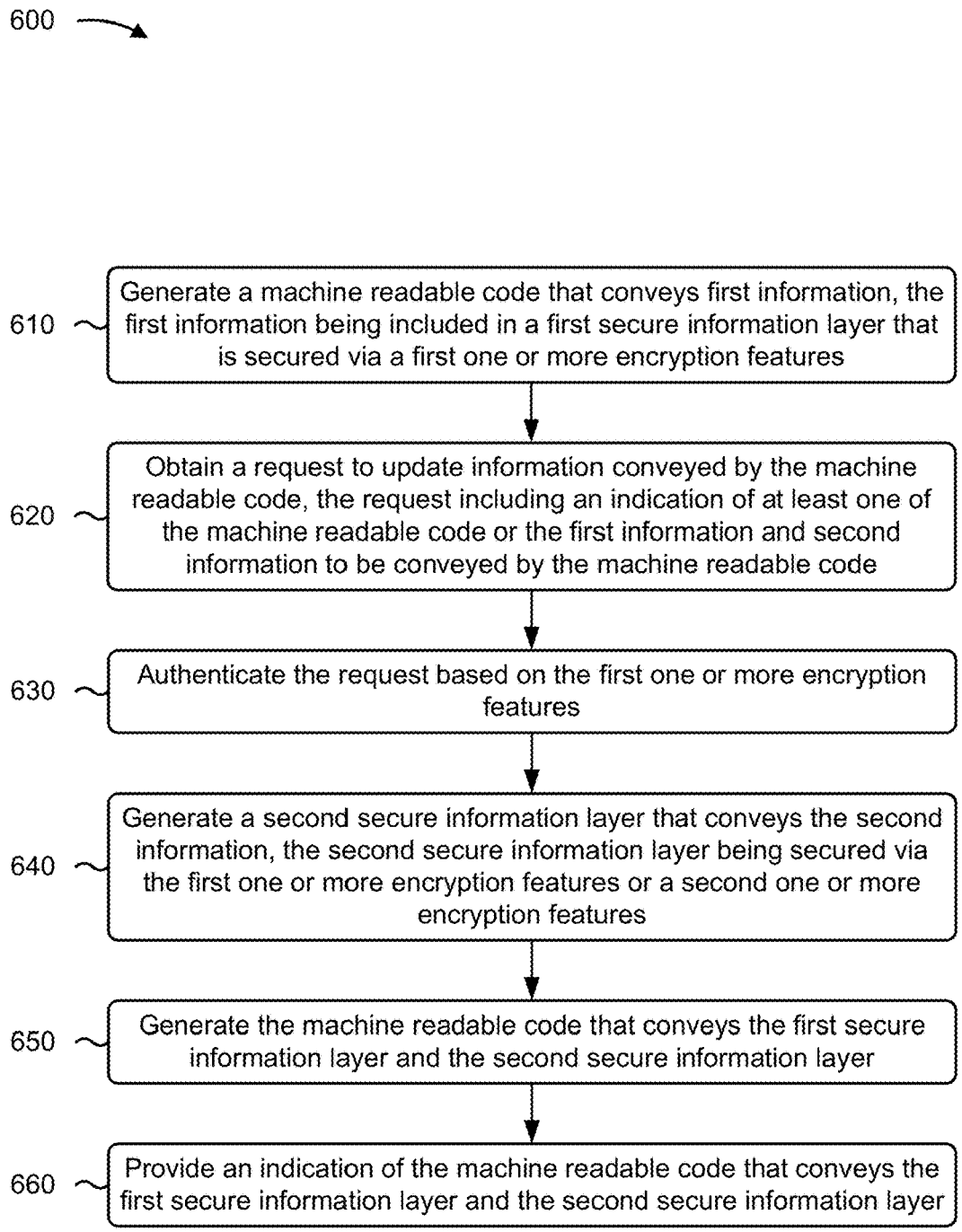
FIG. 6 is a flowchart of an example method associated with a dynamic machine readable code.

FIG. 6 is a flowchart of an example method 600 associated with a dynamic machine readable code. In some implementations, a code management device (e.g., the code management device 305) may perform or may be configured to perform the method 600. In some implementations, another device or a group of devices separate from or including the code management device (e.g., the communication device 310, a user device 315, and/or the database 320) may perform or may be configured to perform the method 600. Additionally, or alternatively, one or more components of the code management device (e.g., the processor 420, the memory 430, the input component 440, the output component 450, and/or the communication component 460) may perform or may be configured to perform the method 600. Thus, means for performing the method 600 may include the code management device and/or one or more components of the code management device. Additionally, or alternatively, a non-transitory computer-readable medium may store one or more instructions that, when executed by the code management device, cause the code management device to perform the method 600.

As shown in FIG. 6, the method 600 may include generating a machine readable code that conveys first information, the first information being included in a first secure information layer that is secured via a first one or more encryption features (block 610). As further shown in FIG. 6, the method 600 may include obtaining a request to update information conveyed by the machine readable code, the request including an indication of at least one of the machine readable code or the first information and second information to be conveyed by the machine readable code (block 620). As further shown in FIG. 6, the method 600 may include authenticating the request based on the first one or more encryption features (block 630). As further shown in FIG. 6, the method 600 may include generating a second secure information layer that conveys the second information, the second secure information layer being secured via the first one or more encryption features or a second one or more encryption features (block 640). As further shown in FIG. 6, the method 600 may include generating the machine readable code that conveys the first secure information layer and the second secure information layer (block 650). As further shown in FIG. 6, the method 600 may include providing an indication of the machine readable code that conveys the first secure information layer and the second secure information layer (block 660).

The method 600 may include additional aspects, such as any single aspect or any combination of aspects described below and/or described in connection with one or more other methods or operations described elsewhere herein.

In a first aspect, an encryption feature, from the first one or more encryption features or the second one or more encryption features, includes at least one of a private key encoded in an image of the machine readable code, a first feature associated with an orientation or a color of the image of the machine readable code, or a second feature associated with the image of the machine readable code that causes the image to not be recognized by one or more machine readable code scanning techniques.

In a second aspect, alone or in combination with the first aspect, the method 600 includes storing an indication of the first secure information layer and the second secure information layer to indicate a history of an item or a service associated with the machine readable code.

In a third aspect, alone or in combination with one or more of the first and second aspects, the machine readable code is associated with an item or a service, wherein the first information is associated with an owner of the item or the service, and wherein the second information is associated with a user of the item or the service.

In a fourth aspect, alone or in combination with one or more of the first through third aspects, generating the machine readable code that conveys the first secure information layer and the second secure information layer comprises causing an image of the machine readable code, that previously conveyed the first information, to convey the first information and the second information.

In a fifth aspect, alone or in combination with one or more of the first through fourth aspects, the machine readable code is a QR code.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a system includes a memory; and one or more components configured to: generate a QR code that indicates first information associated with at least one of an item or a first entity, wherein the QR code is encrypted via at least one of a private key or a feature to be displayed in connection with the QR code; transmit, to a communication device associated with the item, an indication of the QR code that indicates the first information; receive a request to update the QR code, the request including an indication of at least one of the QR code or the first information; authenticate the request based on at least one of the private key or the feature being indicated in the request to update the QR code; generate second information for the QR code based on the request, wherein the second information includes the first information and information indicated by the request, and wherein generating the second information causes the QR code to indicate the second information; and transmit, to the communication device, an indication of at least one of the QR code or the second information.

In some implementations, a method includes generating, by a server device, a machine readable code that conveys first information associated with a first entity, providing, by the server device to a communication device, an indication of the machine readable code that indicates the first information; obtaining, by the server device, a request to update information conveyed by the machine readable code, the request including an indication of at least one of the machine readable code or the first information; modifying, by the server device, the first information conveyed by the machine readable code to second information, based on the request and based on authenticating the request, wherein the second information includes a first secure information layer indicating the first information and a second secure information layer indicating information indicated by the request; and providing, by the server device and to the communication device, an indication of at least one of the machine readable code or the second information.

In some implementations, an apparatus includes means for generating a machine readable code that conveys first information, the first information being included in a first secure information layer that is secured via a first one or more encryption features; means for obtaining a request to update information conveyed by the machine readable code, the request including an indication of at least one of the machine readable code or the first information and second information to be conveyed by the machine readable code; means for authenticating the request based on the first one or more encryption features; means for generating a second secure information layer that conveys the second information, the second secure information layer being secured via the first one or more encryption features or a second one or more encryption features; means for generating the machine readable code that conveys the first secure information layer and the second secure information layer; and means for providing an indication of the machine readable code that conveys the first secure information layer and the second secure information layer.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
a memory; and
one or more components configured to:
receive an indication of a quick response (QR) code that conveys first information associated with a first entity;
transmit a request to update information conveyed by the QR code, the request including an indication of at least one of the QR code or the first information; and
receive an indication of at least one of second information or an updated QR code that conveys the second information,
wherein the second information includes a first secure information layer indicating the first information and a second secure information layer indicating information indicated by the request.

2. The system of claim 1, wherein the request indicates at least one of:
an encryption key encoded in the first information,
a secure feature included in an image of the QR code,
an authentication key, or
an order of entities associated with the QR code.

3. The system of claim 1, wherein the one or more components are further configured to:
transmit an indication of an authentication key,
wherein the authentication key includes at least one of a private key or a feature to be displayed in connection with the QR code; and
receive a communication that enables the one or more components to perform an action associated with the QR code.

4. The system of claim 3, wherein the action includes:
processing or decoding the QR code,
decoding a security feature associated with an image of the QR code, or
submitting the request to update the QR code.

5. The system of claim 1, wherein the QR code is a virtual QR code that is associated with a single image and is capable of conveying different information based on information, including the first information or the second information, stored by the one or more components.

6. The system of claim 1, wherein the first entity is associated with an order of entities, wherein the request is associated with a next entity as indicated by the order of entities.

7. The system of claim 1, wherein the first information further includes at least one of an authentication key associated with the QR code or a private key.

8. The system of claim 1, wherein the first entity is associated with at least one of an item, a service, a product, or a location.

9. A method, comprising:
obtaining, by a communication device, an indication of a machine readable code that conveys first information associated with a first entity;
providing, by the communication device to a server device, a request to update information conveyed by the machine readable code, the request including an indication of at least one of the machine readable code or the first information; and
obtaining, by the communication device, an indication of at least one of second information or an updated machine readable code that conveys the second information,
wherein the second information includes a first secure information layer indicating the first information and a second secure information layer indicating information indicated by the request.

10. The method of claim 9, wherein the request indicates at least one of:
an encryption key encoded in the first information,
a secure feature included in an image of the machine readable code,
an authentication key, or
an order of entities associated with the machine readable code.

11. The method of claim 9, further comprising:
providing, by the communication device to the server device, an indication of an authentication key,
wherein the authentication key includes at least one of a private key or a feature to be displayed in connection with the machine readable code; and
obtaining, by the communication device, a communication that enables performance of an action associated with the machine readable code.

12. The method of claim 11, wherein the action includes at least one of:
processing or decoding the machine readable code,
decoding a security feature associated with an image of the machine readable code, or
submitting the request to update the machine readable code.

13. The method of claim 9, wherein the machine readable code is a virtual quick response (QR) code that is associated with a single image and is capable of conveying different information based on information, including the first information or the second information, stored by the communication device.

14. The method of claim 9, wherein the first entity is associated with an order of entities, wherein the request is associated with a next entity as indicated by the order of entities.

15. The method of claim 9, wherein the first information further includes at least one of an authentication key associated with the machine readable code or a private key.

16. The method of claim 9, wherein the first entity is associated with at least one of an item, a service, a product, or a location.

17. An apparatus, comprising:
means for obtaining an indication of a machine readable code that conveys first information associated with a first entity;
means for providing a request to update information conveyed by the machine readable code, the request including an indication of at least one of the machine readable code or the first information; and
means for obtaining an indication of at least one of second information or an updated machine readable code that conveys the second information,
wherein the second information includes a first secure information layer indicating the first information and a second secure information layer indicating information indicated by the request.

18. The apparatus of claim 17, wherein the request indicates at least one of:
   an encryption key encoded in the first information,
   a secure feature included in an image of the machine readable code,
   an authentication key, or
   an order of entities associated with the machine readable code.

19. The apparatus of claim 17, wherein the machine readable code is a virtual quick response (QR) code that is associated with a single image and is capable of conveying different information based on information, including the first information or the second information, stored by the apparatus.

20. The apparatus of claim 17, wherein the first information further includes at least one of an authentication key associated with the machine readable code or a private key.

* * * * *